United States Patent [19]

Moore

[11] Patent Number: 4,788,121

[45] Date of Patent: Nov. 29, 1988

[54] COLORED TONERS CONTAINING DICYANOMETHINE DYE COMPOUNDS

[75] Inventor: William H. Moore, Kingsport, Tenn.

[73] Assignee: Eastman Kodak Company, Rochester, N.Y.

[21] Appl. No.: 920,334

[22] Filed: Oct. 17, 1986

[51] Int. Cl.$^4$ .......................... G03G 9/08; G03G 9/10
[52] U.S. Cl. ..................................... 430/106; 546/165; 546/176
[58] Field of Search ......................................... 430/106

[56] References Cited

U.S. PATENT DOCUMENTS

| | | |
|---|---|---|
| 3,240,783 | 3/1966 | Straley et al. |
| 3,247,211 | 4/1966 | Weaver et al. |
| 3,398,152 | 8/1968 | Wallace et al. |
| 3,453,280 | 7/1969 | Weaver et al. |
| 3,553,245 | 1/1971 | Weaver et al. |
| 3,595,863 | 7/1971 | Coates, Jr. et al. |
| 3,597,434 | 8/1971 | Weaver. |
| 3,631,049 | 12/1971 | Straley et al. |
| 3,879,434 | 4/1975 | Weaver. |
| 4,161,601 | 7/1979 | Coates, Jr. et al. ................ 546/176 |
| 4,180,663 | 12/1979 | Frishberg ............................ 544/105 |
| 4,380,633 | 4/1983 | Coates, Jr. et al. ................ 544/316 |

FOREIGN PATENT DOCUMENTS

| | | | |
|---|---|---|---|
| 1219328 | 6/1966 | Fed. Rep. of Germany ...... 430/106 |
| 58-102247 | 6/1983 | Japan .................................. 430/106 |

*Primary Examiner*—Roland E. Martin
*Attorney, Agent, or Firm*—Richard D. Fuerle

[57] ABSTRACT

Disclosed is an electrostatographic toner comprising a thermoplastic polymer and a tetrahydroquinoline dicyanomethine yellow dye having the formula soluble in

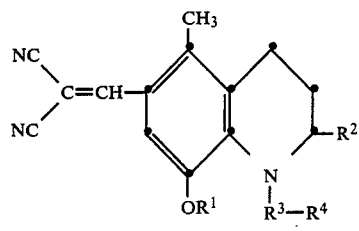

or

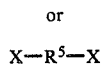

II wherein $R^1$ and $R^2$ are lower alkyl, $R^3$ is lower alkylene, $R^4$ is dicarboximido of 4 to 8 carbon atoms, benzothiazolyl-2-thio of alkylcarboxy of 4 to 18 carbon atoms, $R^5$ is alkylene of 4 to 10 carbon atoms or arylene of 6 to 10 carbon atoms and X is

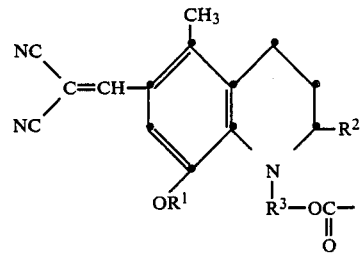

9 Claims, No Drawings

COLORED TONERS CONTAINING DICYANOMETHINE DYE COMPOUNDS

FIELD OF THE INVENTION

This invention relates to colored toners for eletrostatography.

BACKGROUND

In electrophotography and other forms of electrostatography a charge pattern latent image disposed on an insulating surface can be developed by contact with a dry powdered toner composition composed of finely divided charged particles of a polymer which contains a colorant. The latter can be carbon black or an organic dye or pigment which provides a desired hue for color development of the charge pattern.

For toners used to form multicolor images which are thermally fused to paper or other substrates, the colorant compound requires an unusual combination of properties. One requirement is that the colorant must be thermally stable to withstand the temperature at which it is blended with the thermoplastic toner polymer and the temperatures at which the toner is thermally fused during the image fixing step of an electrostatographic process.

Another requirement is that the colorant should not sublime excessively at the toner fixing temperature, for otherwise the optical density of the developed image would be reduced. Of course, a basic requirement is also that the colorant should have adequate tinctorial strength to provide an image of adequate density.

Still further, toners that are used in multicolor development or for making color transparencies for optical projection must form transparent images. In order for the image to be transparent the colorant must be soluble in the binder resin of the toner. Pigment particles which are insoluble in the thermoplastic polymer cause light scattering and are unsatisfactory because transparency is diminished. Soluble colorants and dyes alleviate scattering problems. The colorant must be a dye compound which is soluble in the polymer in order to provide a satisfactorily transparent image when the toner is fixed to a substrate.

In addition, for toners that are to be used for development of images on both sides of a substrate, e.g., in two-sided copying on paper, the colorant must not bleed or migrate from the toner resin. Otherwise, the image from one side of the paper sheet would appear also on the other side. The toners of this invention contain methine dyes that are immobile in the polyester binder matrix.

Of the many colorants which are useful as pigments or dyes for various purposes, as in textile dyes, paints, etc., few possess the combination of properties required for colorants to be used in transparent electrostatographic thermoplastic toners. The present invention provides toners containing a class of yellow dyes which unexpectedly have the required combination of properties, some of which dyes are novel compounds per se.

SUMMARY OF THE INVENTION

The toners of the invention comprise a thermoplastic polymer and blended with the polymer a dye compound of the invention which is of the formula:

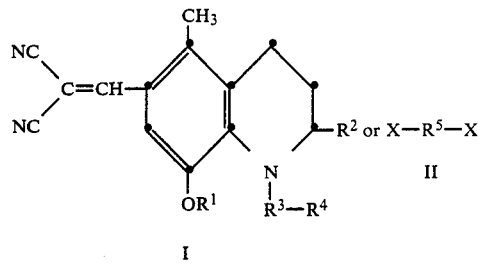

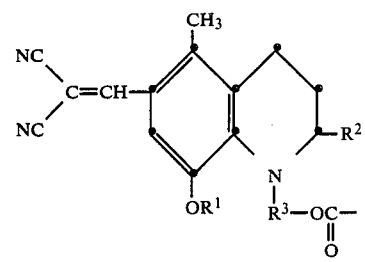

wherein $R^1$ and $R^2$ are lower alkyl, $R^3$ is lower alkylene, $R^4$ is dicarboximido of 4 to 8 carbon atoms or benzothiazolyl-2-thio or alkylcarboxy of 4 to 18 carbon atoms, $R^5$ is alkylene of 4 to 10 carbon atoms, or arylene of 6 to 10 carbon atoms and X is In preferred embodiments the thermoplastic polymer is a polyester and the toner also optionally contains a charge control agent.

The present invention also includes novel tetrahydroquinoline compounds which are intermediates for the dye compounds of the invention.

DETAILED DESCRIPTION OF THE INVENTION

In the compounds of the invention as defined above, various substituents are suitable. For instance, the substituents $R^1$ and $R^2$ can be any lower alkyl groups, the same or different, up to about 4 carbon atoms including straight and branched alkyl groups (e.g. methyl, ethyl, n-propyl and t-butyl). Methyl is a preferred substituent. $R^3$ can be any lower alkylene groups up to about 4 carbon atoms (e.g., methylene, ethylene, n-propylene and t-butylene). $R^4$ is dicarboximido of 4 to 8 carbon atoms (e.g. phthalimido and succinimido), benzothiazolyl-2-thio or alkylcarboxy of 4 to 18 carbon atoms (e.g., butyroxy, hexanoyloxy, decanoyloxy, dodecanoyloxy and octdecanoyloxy, of which dodecanoyloxy is preferred.) $R^5$ is alkylene of 4 to 10 carbon atoms (e.g., butylene, octylene and decylene) ior arylene (e.g., phenylene and o-methylphenylene).

Novel intermediate compounds of the invention which are useful in the synthesis of the dye compounds I and II are of the formula

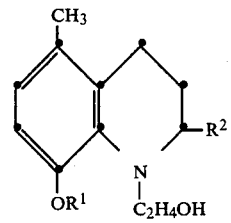

wherein R¹ and R² have the meanings indicated above.

Compounds III can be prepared by starting with a 2-alkoxy-5-methyl aniline such as 2-methoxy-5-methyl aniline, as illustrated by the following reactions:

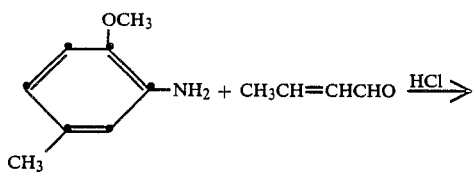  (1)

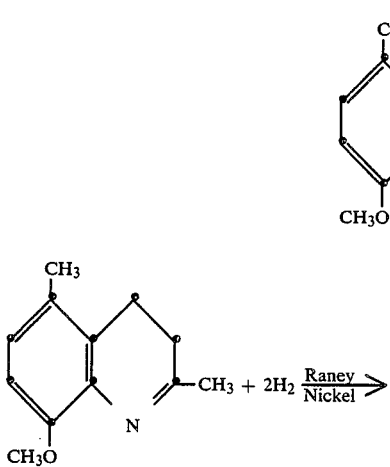

III(a)

The use of intermediate III to prepare a dye compound of the invention involves the formylation of the intermediate by the well-known Vilsmeier-Haack reaction, using POCl₃ and dimethylformamide (DMF); as illustrated specifically with compound III(a):

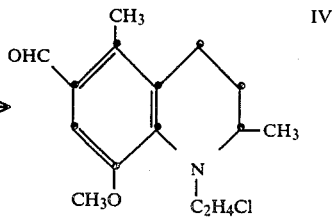

This is followed by a reaction which modifies the N-substituent appropriately:

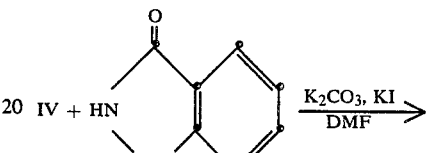

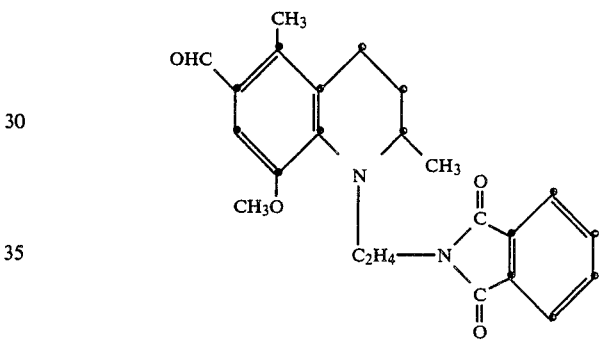

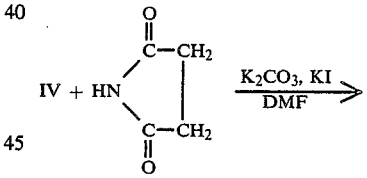

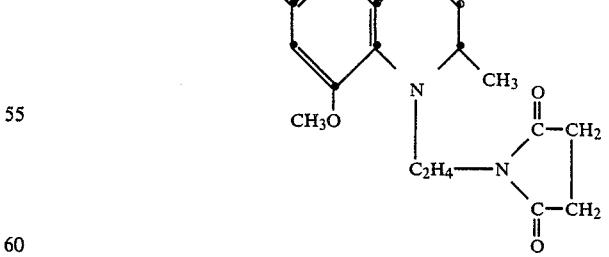

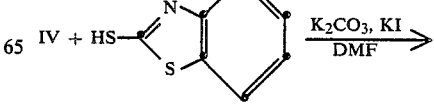

-continued

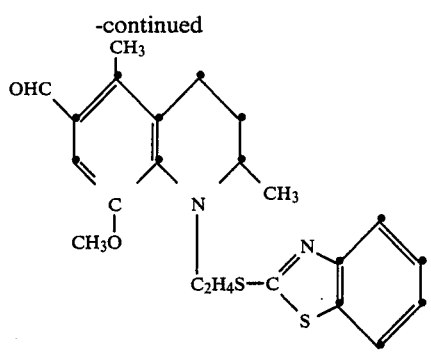

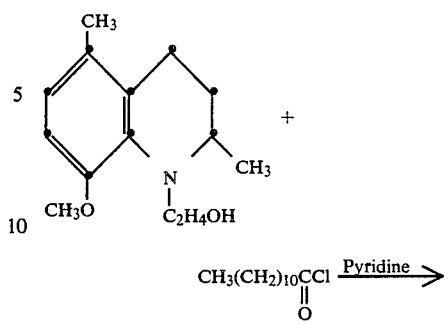

Condensation of these aldehydes with malononitrile affords the corresponding dyes of the invention:

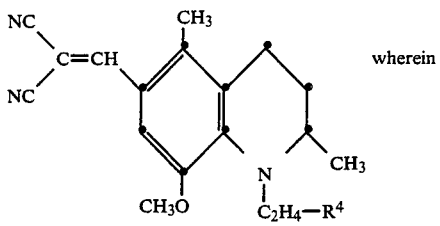

wherein

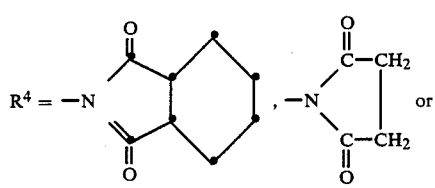

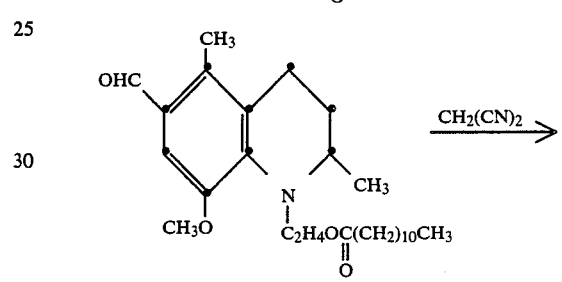

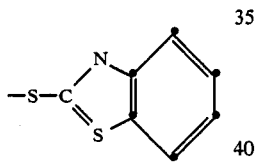

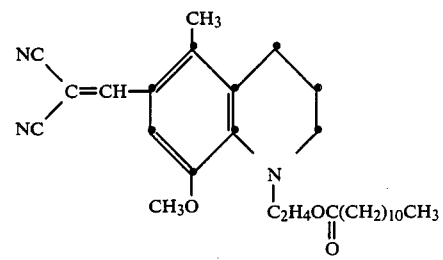

Intermediate III can also be used to prepare a dye of the invention wherein the N-substituent is a long chain alkyloxy-carbalkyl group, as the following reactions illustrate:

Intermediate III can also be used to prepare bis(tetrahydroquinoline) dyes II of the invention, as illustrated in the following reactions; the first of which is the reaction with a dicarboxylic acid halide in a 2:1 molar ratio:

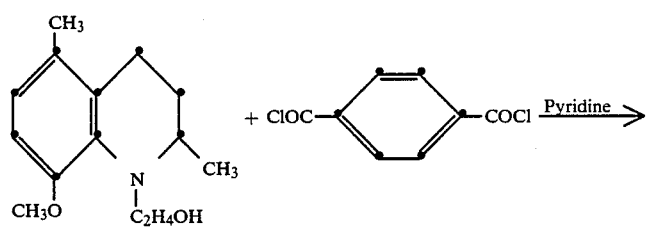

-continued

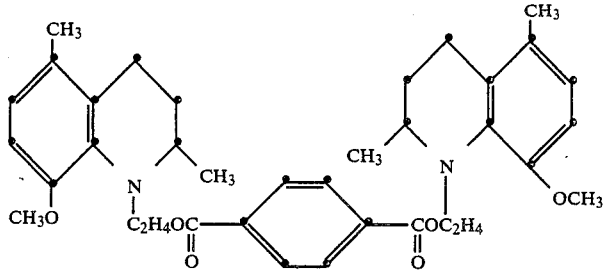

Subjecting the above reaction product to the formylation reaction over a period of two hours at 85°–90° C. yields the aldehyde product which is reacted with malononitrile to provide the following yellow dye compound of the invention:

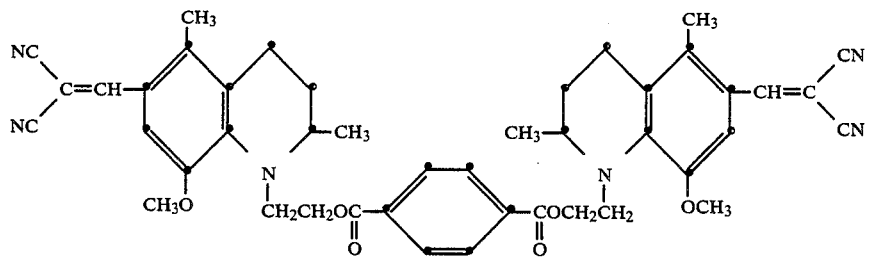

Reactions of the general classes illustrated above have been used to prepare tetrahydroquinoline dicyano methine dyes as disclosed in earlier patents, e.g., U.S. Pat. No. 3,595,863; U.S. Pat. No. 3,240,783; U.S. Pat. No. 3,597,434; U.S. Pat. No. 4,161,601; and U.S. Pat. No. 3,631,049. The dyes and intermediate compounds of the present invention can be prepared by reactions that use the same catalysts, solvents and reaction conditions as disclosed in the cited patents.

The toners of the invention are prepared by blending a selected thermoplastic polymer with a yellow dye compound of the invention, the blending being done, for example, by mixing the polymer in granular or pelleted form with the dye and other toner components in suitable proportions and then blending the mixture on heated compounding rolls in known manner. After blending, the toner composition is coarsely ground in a mechanical mill and then is ground to a fine powder in a fluid energy mill.

The toner polymer can be any transparent thermoplastic resin in which the dye is sufficiently soluble to form a transparent image. Examples of suitable thermoplastic polymers include polyesters of one or more alkylene glycols and one or more aromatic dicarboxylic acids, especially poly(ethylene terephthalate) and copolyesters such of terephthalic acid. Other useful polymers include acrylics and styrene-acrylic copolymers such as poly(methyl methacrylate) and poly(styrene-co-isobutylmethacrylate).

Polymers that are useful as toner polymers have glass transition temperatures in the range from about 40° to 90° C. The blending of the polymer and dye occurs in the range of 110° to 170° C. as does the thermal fusion of the toner during image fixing. The dyes of the present invention do not decompose and do not sublime substantially in this temperature range.

The concentration of dye in the toner composition can range from about 0.5 to 10 weight percent, concentrations from 1 to 4 weight percent being preferred.

Additional components of the toner can include a charge control agent to aid in maintaining a stable charge on the toner during the development process. A wide choice of these components is available, including charge agents such as disclosed in U.S. Pat. Nos. 4,496,643, 3,893,935 and 4,394,430. The charge agent is used in a concentration from about 0.1 to 5 weight percent of the toner composition.

The preparation of specific compounds of the invention is illustrated by the following examples:

EXAMPLE 1

Preparation of Intermediate III

To a solution of 0.34 l concentrated HCl at 40° C. was added 275 parts 2-methoxy-5-methylaniline and further heated to 80° C. Then 154 parts crotonaldehyde was added dropwise, heated to 100° C. for 1 hour. The reaction was cooled to 30° C. and poured into 2.5 l ice water and neutralized with 50% NaOH. The product was filtered, washed with water, water pressed, washed with hexane and air dried to give 65% yield of 2,5-dimethyl-8-methoxyquinoline.

Then 243 parts of 2,5-dimethyl-8-methoxyquinoline in 0.6 l propanol and 20 parts Raney nickel were hydrogenated at 80° C. under 6.9 MPa for 4 hours. This was filtered and solvent stripped under reduced pressure and distilled in vacuum to yield 60% of 2,5-dimethyl-8-methoxy-1,2,3,4-tetrahydroquinoline.

Next 355 parts of 2,5-dimethyl-8-methoxytetrahydroquinoline in 0.4 l ethanol with 86 parts ethylene oxide was reacted under pressure at 175° C. for 10 hours. The solvent was stripped under reduced pressure to an oil which eventually solidifed to give 97% N-(β-hydroxyethyl)-2,5-dimethyl-8-methoxytetrahydroquinoline.

Preparation of Intermediate IV

In 0.2 l chilled dimethylformamide (DMF) was added 118 parts N-(β-hydroxyethyl)-2,5-dimethyl-8-methoxytetrahydroquinoline and 169 parts phosphorous oxychloride was added dropwise. After the addition was complete, the reaction was heated to 80° C. for 1½ hours, then cooled to room temperature.

EXAMPLE 2

Preparation of the dye

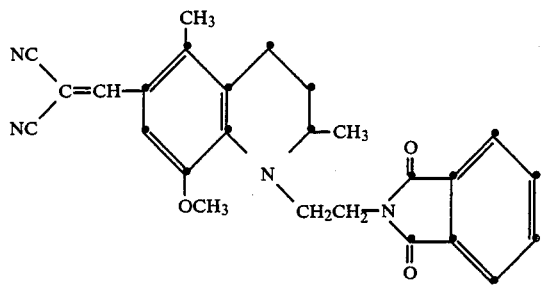

A mixture of 8.5 parts of intermediate IV, 4.4 parts phthalimide, 4.1 parts potassium carbonate and 0.04 l dimethylformamide was stirred at 135° C. for 2 hours. The mixture was cooled poured into ice water for 10 minutes. The solid was filtered and dried to yield 9.2 parts N-(2'-phthalimidoethyl)-2,5-dimethyl-6-formyl-8-methoxytetrahydroquinoline. To 3.9 parts of the latter in 0.11 l ethanol, was added 0.72 parts malononitrile and 6 drops piperidine. The mixture was heated at reflux for 2 hours, cooled, filtered, washed with ethanol and air dried to yield 4 parts of the above indicated dye.

EXAMPLE 3

Preparation of the dye

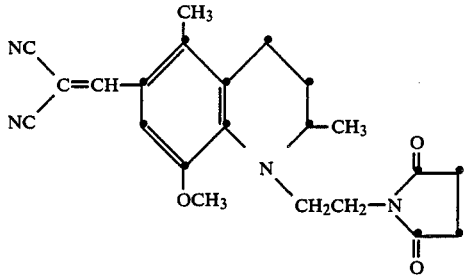

A mixture of 14 parts intermediate IV, 5 parts succinimide, 6.9 parts potassium iodide and 0.075 l DMF were stirred at 135° C. for 1½ hours, cooled, poured into ice water and stirred for 10 minutes. The solid was filtered, washed with water and air dried to yield 15 parts N-(β-succinimidoethyl)-2,5-dimethyl-6-formyl-8-methoxytetrahydroquinoline.

The final dye was made as in example 2 using 6.9 parts of the aforementioned intermediate, 1.45 parts malononitrile, 5 drops piperidine and 0.1 l ethanol. This yielded 4.2 g of the above dye.

EXAMPLE 4

Preparation of the dye

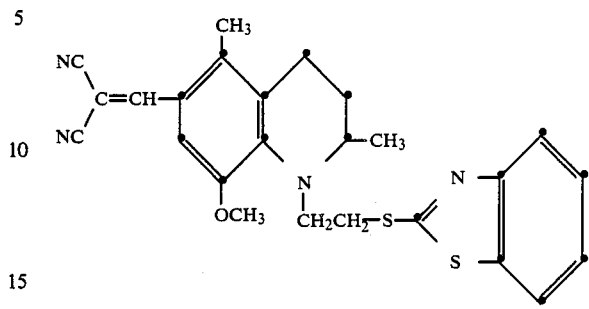

A mixture of 14 parts intermediate formula IV, 8.4 parts 2-thiobenzothiazole, 6.9 parts potassium carbonate, 0.2 parts potassium iodide and 0.075 l DMF were stirred on a steam bath for 4½ hours, cooled and poured into ice water containing NaCl and stirred for 10 minutes. The solid was dissolved in methylene chloride, separated from water in a separatory funnel, dried over magnesium sulfate and the solvent evaporated. This yielded 21 parts N-(2'-benzothiazolylthioethyl)-2,5-dimethyl-6-formyl-8-methoxytetrahydroquinoline.

The final dye was made as in Example 2 using 21 parts of the aforementioned intermediate, 3.7 parts malononitrile, 10 drops piperidine, and 0.25 l ethanol. This yielded 21 parts of the dye above.

EXAMPLE 5

Preparation of the dye

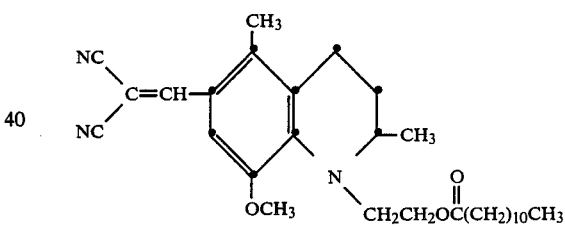

A mixture of 2.4 parts intermediate formula III(a) and 0.015 l pyridine was chilled in an ice bath and 2.2 parts lauroyl chloride was added portionwise keeping the temperature below 7° C. After addition was completed, the reaction mixture was stirred at room temperature for ½ hour, poured into ice water with 0.015 l concentrated HCl, yielding an oil layer. The oil was dissolved in methylene chloride, separated from the water, dried over magnesium sulfate, and the solvent was evaporated. The yield was 3 parts N-(β-dodecyloxycarbonylethyl)-2,5-dimethyl-8-methoxytetrahydroquinoline. This reaction was repeated.

The aforementioned intermediate, 417 parts, in 0.1 l dimethylformamide was chilled over ice. To this was added 17 parts phosphorous oxychloride at 5°-10° C. over a period of 15 minutes. The reaction was warmed to room temperature and stirred for 15 minutes, placed on a steam bath and heated for 50 minutes, then cooled to 25° C.

This reaction product was added to a mixture of 7.3 parts malononitrile, 4 parts sodium acetate and 0.23 l isopropanol over a period of 2 hours keeping the temperature less than 30° C. It was stirred at 60° C. for 2 hours, cooled to 40° C. and 0.5 l water was added through a dropping funnel. This mixture was stirred for 1 hour, then filtered to collect the dye which was washed with water, air dried and recrystallized from hexane.

EXAMPLE 6
Preparation of the dye

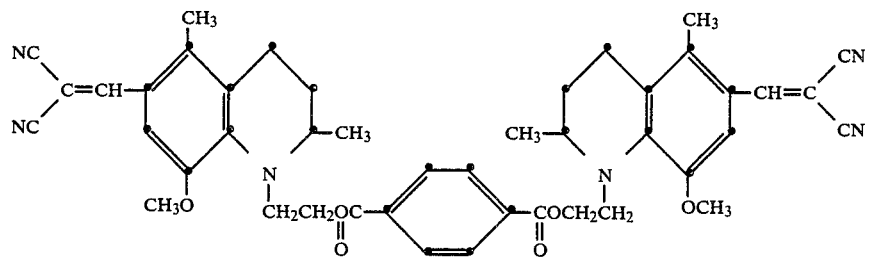

A mixture of 24 parts intermediate formula III, 10.2 part terephthalolyl chloride and 0.1 l pyridine were heated on a steam bath for 1 hour. The reaction was cooled and poured into ice water containing 0.1 l concentrated HCl and adjusted with a few drops NH4OH. The sticky product was dissolved in methylene chloride, washed with water and dried with magnesium sulfate. The solution was stirred with charcoal and filtered to give a yellow solution which was stripped under reduced pressure and chromatographed to give 17.7 parts pure product.

This product was further reacted with malononitrile in the usual manner to yield the above indicated dye.

Toner Sample Preparation

Toner samples were prepared by blending a thermoplastic polyester resin with a yellow dye of the invention, using a two-roll compounding mill at 125° C. for 10 to 20 minutes. The resulting product was coarse ground in a mechanical mill and then ground to a fine powder in a fluid energy mill operating at 70 psi and at a feed rate of 1 to 2 g/min. The different toner samples were then tested for spectral and bleeding characteristics by manually applying the toner to a coated paper ("Vintage Gloss" paper supplied by Potlatch Company). The toner was fused to the paper at 155° C. and ferrotyped by pressing with a sheet of polyester film at the same temperature. The reflection density aim was 1.0. Solubility test smears were prepared by melting compounded toner on a glass microscope slide at 200° C., and pressing into a thin layer with a cover slide.

Toner Testing (a) Diffuse reflection spectra were recorded for each sample of toner image on paper.

(b) Solubility of the dye in the binder resin was determined by viewing the slide in transmitted light on a microscope at 400×. Any particulate matter in the sample indicated insolubility.

(c) Bleeding through the paper was tested at room temprature and at 40° C. The density of any toner appearing on the back of the paper was recorded initially and at intervals. Blue absorption by the yellow dye was measured with a densitometer and a Status D filter.

(d) Sublimation was tested by placing approximately 0.25 g of toner on a glass slide which was placed on a hot plate at 150° C. The slide was covered by an inverted funnel having a white polyester filter packed in its neck. The funnel stem was attached to a vacuum line and after 10 minutes the filter was examined for any yellow coloration.

All of the tested dyes of the invention were soluble in the polyester and none of them sublimed substantially. However, other dicyanomethine dyes under the same conditions, in toners which were otherwise the same as the toners of the invention, either bled through the paper excessively (i.e., density on the paper back after 1 month at 40° C. = >0.20) or sublimed or were not soluble in the polyester.

The invention has been described in detail with reference to preferred embodiments, but it will be understood that variations and modifications can be made within the spirit and scope of the invention.

We claim:

1. An electrostatographic toner comprising a thermoplastic polymer and a dye compound having the formula

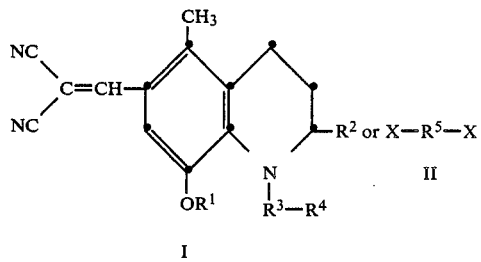

wherein $R^1$ and $R^2$ are lower alkyl, $R^3$ is lower alkylene, $R^4$ is dicarboximido of 4 to 8 carbon atoms, benzothiazolyl-2-thio or alkylcarboxy of 4 to 18 carbon atoms, $R^5$ is alkylene of 4 to 10 carbon atoms or arylene of 6 to 10 carbon atoms and X is

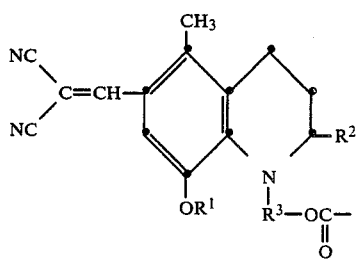

2. An electrostatographic toner comprising a thermoplastic polymer and a dye compound having the formula

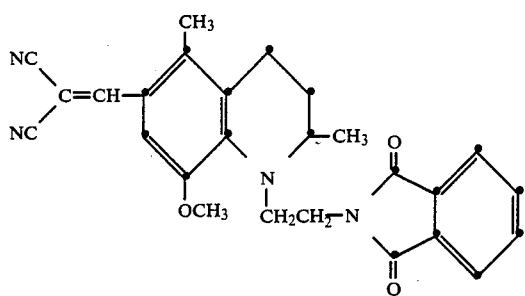

3. An electrostatographic toner comprising a thermoplastic polymer and a dye compound having the formula

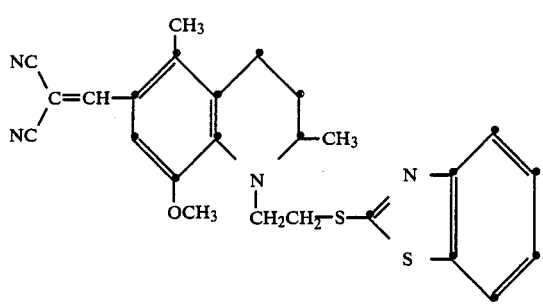

4. An electrostatographic toner comprising a thermoplastic polymer and a dye compound having the formula

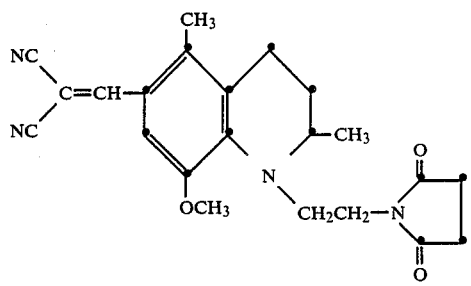

5. An electrostatographic toner comprising a thermoplastic polymer and a dye compound having the formula

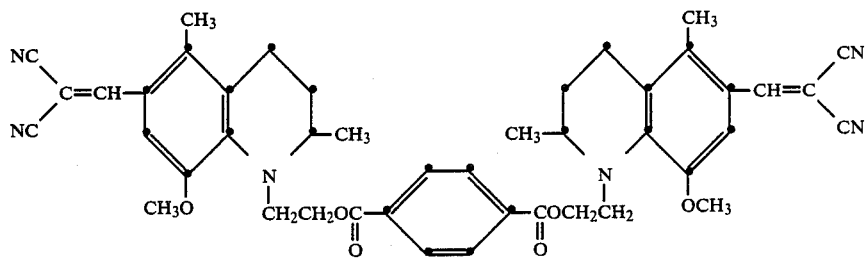

6. An electrostatographic toner comprising a thermoplastic polymer and a dye compound having the formula

7. A toner according to claim 1 containing also a charge control agent.

8. A toner according to claim 1 wherein the dye compound is soluble in the polymer and does not decompose and does not sublime substantially at the fusing temperature of the polymer.

9. A toner according to claim 8 wherein the thermoplastic polymer is a polyester.

* * * * *

UNITED STATES PATENT AND TRADEMARK OFFICE
CERTIFICATE OF CORRECTION

PATENT NO. : 4,788,121
DATED : November 29, 1988
INVENTOR(S) : Jean C. Fleischer, Julie P. Harmon, Thomas A. Jadwin and William H. Moore It is certified that error appears in the above-identified patent and that said Letters Patent is hereby corrected as shown below:

Heading Page, Item [75], insert before "William H. Moore", --Jean C. Fleischer, Kingsport, Tenn., Julie P. Harmon, Rochester, N.Y., Thomas A. Jadwin, Rochester, N.Y.--

Heading Page, Item [57], lines 3-4, delete "soluble in".

Heading Page, Item [19] "Moore" should read -- Fleischer et al. --.

Signed and Sealed this

Second Day of January, 1990

Attest:

JEFFREY M. SAMUELS

Attesting Officer        Acting Commissioner of Patents and Trademarks